United States Patent [19]

Dynie

[11] Patent Number: 4,467,591
[45] Date of Patent: Aug. 28, 1984

[54] ROTOR COMB CONSTRUCTION FOR POWER LAWN RAKE AND METHOD OF ASSEMBLY THEREFOR

[75] Inventor: Ernest R. Dynie, Brockville, Canada
[73] Assignee: Black & Decker Inc., Newark, Del.
[21] Appl. No.: 416,144
[22] Filed: Sep. 9, 1982
[51] Int. Cl.³ .............................................. A01D 7/06
[52] U.S. Cl. .................................... 56/16.4; 56/16.7; 56/364; 56/400
[58] Field of Search ...................... 56/364, 16.4, 16.7, 56/400, 400.02, 400.21, 400 M

[56] References Cited

U.S. PATENT DOCUMENTS

| | | | |
|---|---|---|---|
| 1,104,020 | 7/1914 | Torgersen | 56/400 |
| 2,075,555 | 3/1937 | Synck | 56/400 |
| 2,482,883 | 9/1949 | Thomas | 56/400 |
| 2,608,045 | 8/1952 | Keene | 56/400 |
| 2,722,795 | 11/1955 | Warner | 56/400.02 |
| 2,987,867 | 6/1961 | Nicholson | 56/400 |
| 3,024,587 | 3/1962 | Warnke | 56/14.4 |
| 3,099,347 | 7/1963 | Dahlquist | 199/198 |
| 3,125,844 | 3/1964 | Beyer | 56/16.4 |
| 3,143,494 | 9/1964 | Scheidenhelm | 56/400 |
| 3,394,537 | 7/1963 | Keene | 56/400 |
| 3,478,500 | 11/1969 | Rhoads | 56/16.4 |
| 3,545,187 | 12/1970 | Whitney | 56/16.7 |
| 3,548,580 | 12/1970 | Purrer et al. | 56/400 |
| 3,564,823 | 2/1971 | Rhoads | 56/16.7 |
| 4,300,337 | 11/1981 | Sharp | 56/364 |
| 4,344,273 | 8/1982 | Jobling et al. | 56/364 |

FOREIGN PATENT DOCUMENTS

| | | | |
|---|---|---|---|
| 878829 | 8/1971 | Canada | 56/16.7 |
| 985959 | 3/1965 | United Kingdom | 56/400 |

Primary Examiner—Paul J. Hirsch
Attorney, Agent, or Firm—R. B. Sherer; H. Weinstein; Charles E. Yocum

[57] ABSTRACT

An improved rotor comb construction (and method of assembly) for a power lawn rake has a plurality of spring tines axially stacked along a tubular rotor shaft. Each of the tines has a retention coil portion and a working coil portion spaced therefrom. The retention coil portion frictionally engages the outer surface of the rotor shaft. The working coil portion has a radially-extending ground-engaging element. A radially-inturned end of the retention coil portion is received in a respective radial hole in the shaft, thereby keying the tines to the shaft for conjoint rotation. Each hole in the rotor shaft is displaced circumferentially from its adjacent hole, preferably by an angle $\theta$ which equals 360 degrees divided by the number of holes. With this construction, the holes and hence the spring tines are arranged in a substantially uniform helical formation about the axis of the rotor shaft.

1 Claim, 7 Drawing Figures

ROTOR COMB CONSTRUCTION FOR POWER LAWN RAKE AND METHOD OF ASSEMBLY THEREFOR

FIELD OF THE INVENTION

The present invention relates to a rotor comb construction for a power lawn rake, and more particularly, to a plurality of spring fingers or tines arranged in a helical formation along the rotor shaft of an improved power lawn rake.

BACKGROUND OF THE INVENTION

A power lawn rake is well known in the prior art. One example is described and claimed in the co-pending application Ser. No. 408,483, filed Aug. 16, 1982 for a "Power Lawn Rake" now U.S. Pat. No. 4,446,681 and assigned to the assignee of the present invention. In this co-pending application, the power lawn rake generally comprises a frame including a pair of side housings, a deflector box mounted therebetween, a rotor having a rotor shaft journaled in the side housings forwardly of the deflector box, a plurality of ground-engaging spring fingers or tines positioned on the rotor shaft, the tines being arranged in a helical formation along the axis of the shaft, a removable plastic bin forwardly of the rotor for receiving the dead leaves, grass clippings and other debris picked up by the tines on the rotor, respective forward and rearward wheel means on the frame, and a suitable handle for guiding the power rake over the lawn.

Moreover, in the aforesaid pending application, each of the spring tines comprises a coil spring portion and a spring finger extending radially therefrom and having a bent end portion for engaging the ground. Each of the tines is carried by a respective bracket, which preferably is integrally molded. Each bracket has a central sleeve portion for slipping the bracket over the end of the rotor shaft. Each bracket further has an integral pin, parallel to its sleeve portion, and radially thereof. The coil portion of each spring tine is mounted on the pin of its respective bracket. The end of each pin is received in a pocket formed within the next adjacent bracket on the rotor shaft, and the pocket on each bracket is disposed eccentrically in relation to its respective pin. With this arrangement, the brackets are axially stacked on the rotor shaft but are staggered circumferentially with respect to each other. Since the coil spring portions of the tines are carried by the integral pins on the respective brackets, the tines are arranged in a helical formation axially of the rotor shaft. The degree of eccentricity between adjacent tines may be expressed by an angle $\theta$, where $$\theta = 360 \text{ degrees/number of tines}$$

In addition, suitable means are provided for clamping the brackets against endwise movement on the rotor shaft and for coupling the brackets to the shaft for conjoint rotation, thereby driving the tines.

While this rotor comb construction is entirely satisfactory for the purposes intended, it is not readily adaptable to automated assembly of the rotor.

SUMMARY OF THE PRESENT INVENTION

Accordingly, it is an object of the present invention to provide an improved rotor comb construction for a power lawn rake.

It is another object of the present invention to provide an improved rotor comb construction, which may be fabricated easily and economically, and which facilitates automated manufacture.

It is yet another object of the present invention to provide an improved method for mounting a plurality of ground-engaging tines on the tubular rotor shaft of a power lawn rake.

In accordance with the broad teachings of the present invention, the tubular rotor shaft of the power lawn rake has a plurality of axially-spaced radial holes formed therein. A corresponding plurality of axially-stacked tines are mounted on the shaft. Each tine includes a radially-inturned end portion received in a respective hole, thereby keying the tines to the shaft, and each tine further includes a radially-projecting ground-engaging element.

In accordance with the further teachings of the present invention, each hole in the rotor shaft is displaced circumferentially from its adjacent hole by an angle $\theta$, where $$\theta = 360 \text{ degrees/number of holes}$$

whereby the tines are arranged in a uniform helical formation along the rotor shaft.

In accordance with the still further teachings of the present invention, each tine has a retention coil portion and a working coil portion spaced therefrom and integrally connected thereto. The retention coil portion frictionally engages the outer surface of the shaft. The working coil portion carries the radially-extending ground-engaging element. In a preferred embodiment, the working coil portion is spaced radially of the retention coil portion. In an alternate embodiment, the working coil portion is enlarged radially, is axially alined with the retention coil portion, and is disposed concentrically about the rotor shaft.

These and other objects of the present invention will become apparent from a reading of the following specification, taken in conjunction with the enclosed drawings.

DESCRIPTION OF THE PREFERRED EMBODIMENT

Figure 1:
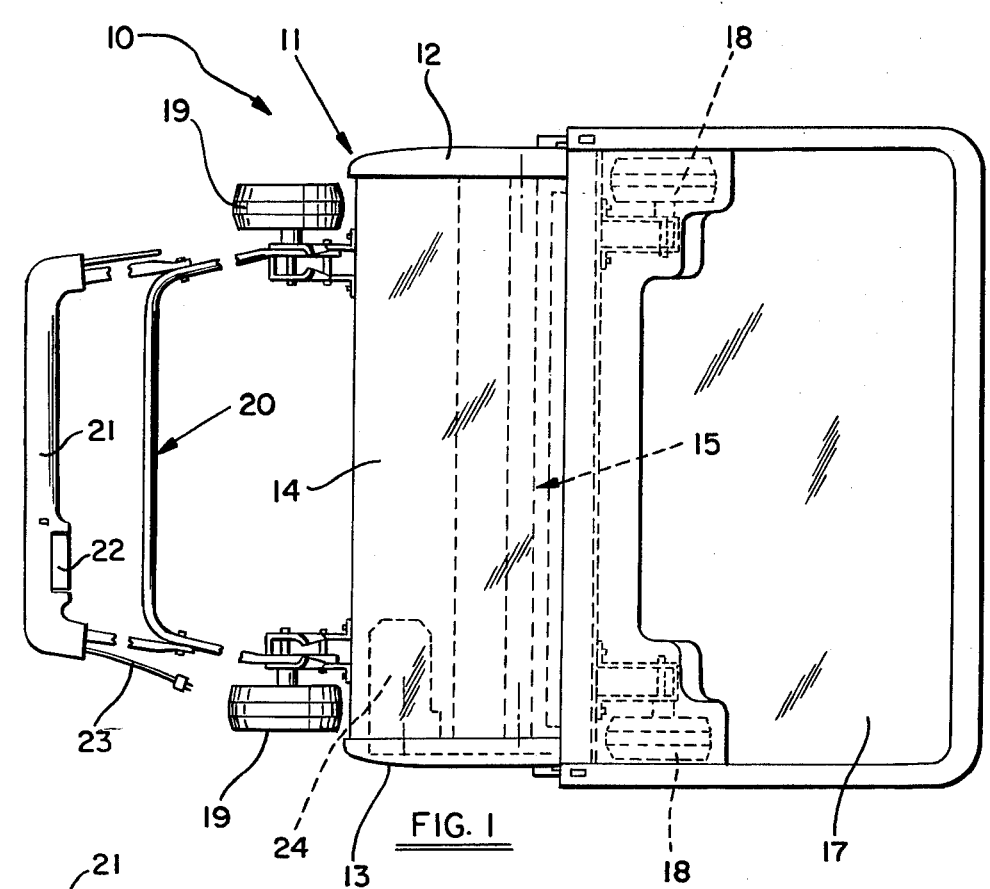
FIG. 1 is a top plan view of a power lawn rake incorporating the teachings of the present invention.
Figure 2:
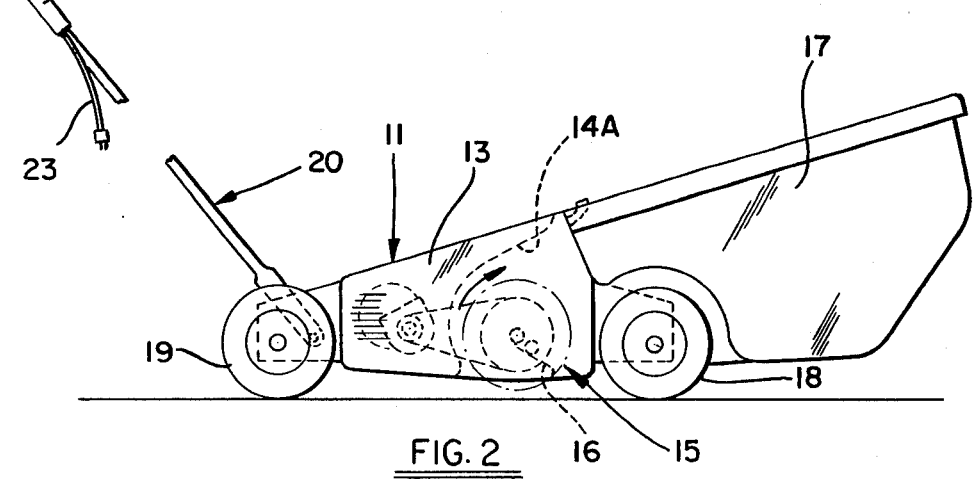
FIG. 2 is a side elevation thereof.

With reference to FIGS. 1 and 2, there is illustrated a power lawn rake 10 with which the teachings of the present invention may find more particular utility. It will be appreciated by those skilled in the art, however, that the teachings of the present invention are equally applicable to a variety of lawn rakes, manual or power operated, as well as other similar tools for lawn and garden usage. With this in mind, the power lawn rake 10 generally comprises a main frame 11 including a pair of spaced-apart side housings 12 and 13, a deflector box 14 mounted between the side housings, a rotor 15 forwardly of the deflector box, the rotor having a plurality of ground-engaging spring tines, one of which is shown at 16 in FIG. 2, a plastic bin 17 removably mounted on the frame forwardly of the rotor, ground-engaging forward wheels 18, ground-engaging rear wheels 19, a handle assembly 20 for manually guiding the power lawn rake, the handle assembly including a hand grip portion 21, a "dead man" switch 22 carried by the hand grip, and a line cord 23 for energizing an electric motor 24, the motor being cantilever mounted on the side housing 13. With this arrangement, and as described in the aforesaid application, the dead leaves, grass clippings and other debris picked up by the ground-engaging tines on the rotor are carried along a curved forward wall 14A on the deflector box, as shown by the small arrow in FIG. 2, and are discharged forwardly into the removable bin.

Figure 3:
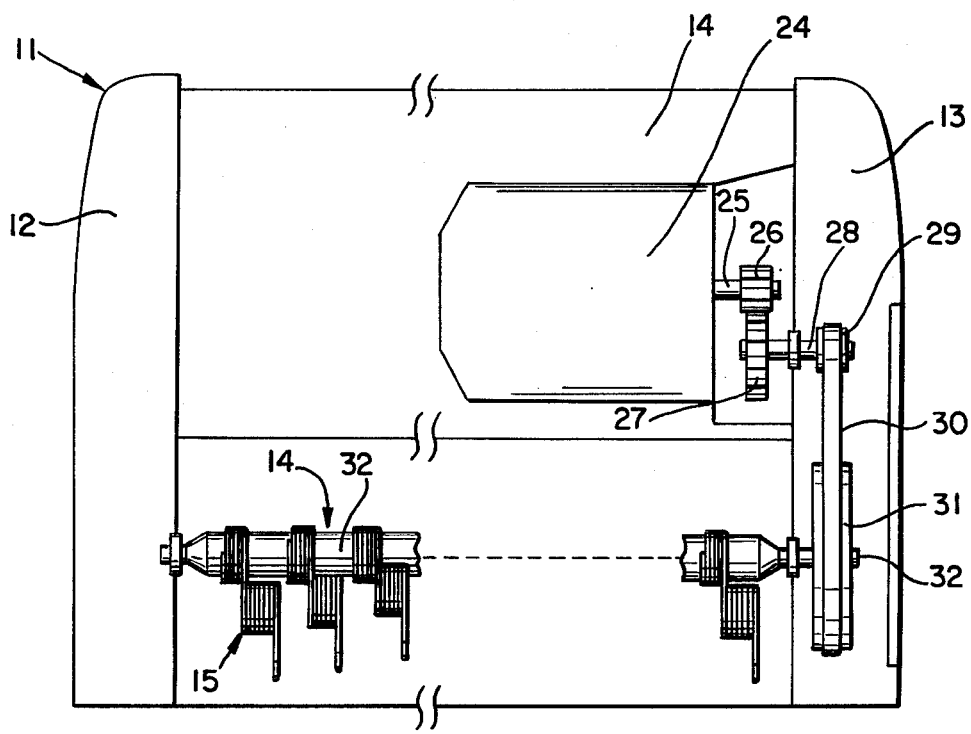
FIG. 3 is a top plan view of the main frame of the power lawn rake, partially schematic and with parts broken away, showing the drive from the motor to the rotor shaft, and further showing a plurality of ground-engaging spring tines axially stacked on the rotor shaft.

With reference again to FIGS. 1 and 2, and with further reference to FIG. 3, the motor 24 has an armature shaft 25 provided with a pinion 26. The pinion meshes with a gear 27 on an output spindle 28 suitably journaled in the side housing 13. A drive pulley 29 is mounted on the spindle and drives a belt 30 carried by a driven pulley 31. The driven pulley 31 is mounted on a shaft 32 of rotor 15, and the rotor shaft is suitably journaled between the side housings.

Figure 4:
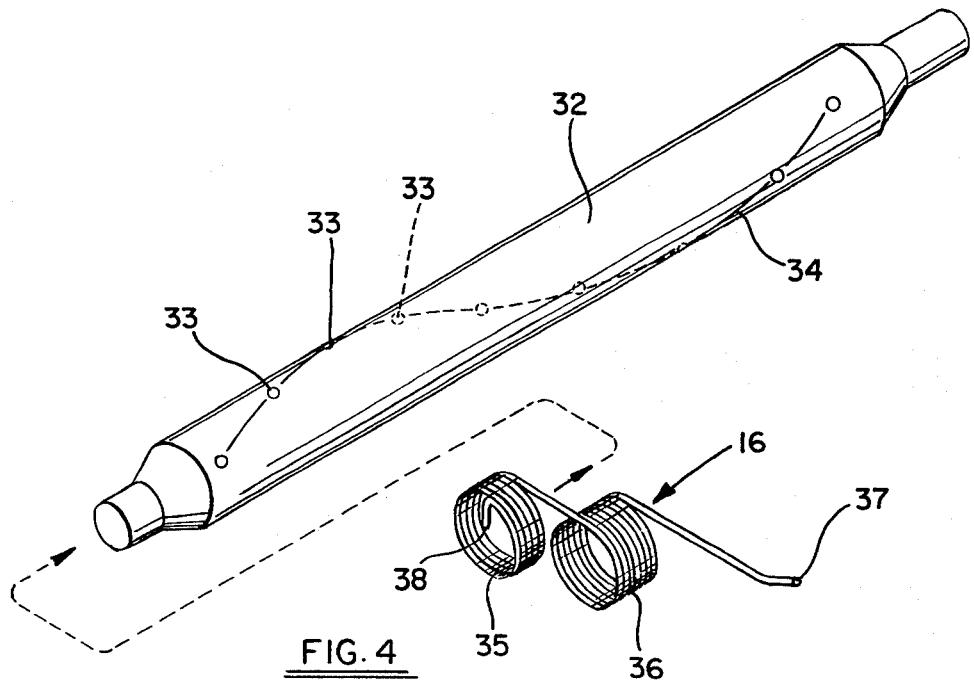
FIG. 4 is an exploded perspective of the rotor shaft, drawn to an enlarged scale, and showing a preferred embodiment of one of the spring tines.
Figure 5:
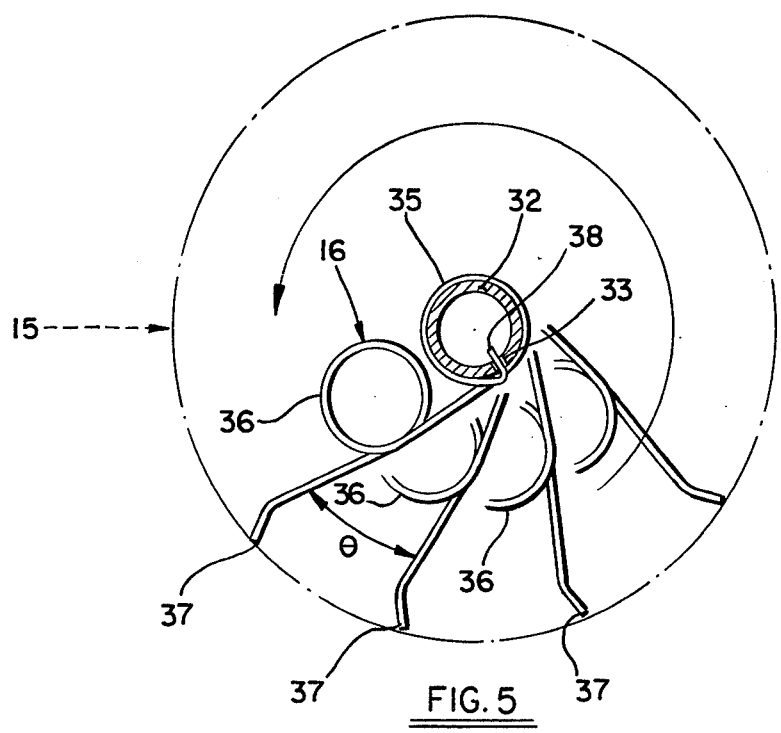
FIG. 5 is an end elevation of the rotor shaft, partially schematic, and showing the manner in which the axially-stacked spring tines are displaced circumferentially of one another, thereby forming a helical arrangement axially of the rotor shaft.

With reference again to FIG. 3, and with further reference to FIGS. 4 and 5, the teachings of the present invention, and the advantages and benefits thereof, will be more readily appreciated. The rotor shaft 32, which is tubular, is provided with a plurality of holes 33 axially spaced relative to one another. Each hole 33 is displaced circumferentially with respect to an adjacent hole by an angle $\theta$, where $$\theta = 360 \text{ degrees/number of holes}$$

whereby the holes 33 are arranged in a substantially uniform helical formation along the rotor shaft, as indicated by the line 34 in FIG. 4.

In the preferred embodiment, each spring tine 16 has a retention coil portion 35 and a working coil portion 36 spaced radially therefrom and integrally connected thereto. The retention coil portion frictionally engages the outer surface of the rotor shaft, while the working coil portion is provided with a ground-engaging bent element 37 formed radially thereof. Each retention coil portion has a radially-inturned end portion 38 received in a respective hole in the tubular rotor shaft, as shown more clearly in FIG. 5, thereby keying the tine to the rotor shaft for conjoint rotation. Since the holes in the rotor shaft are arranged in a helical formation, the tines and the respective ground-engaging elements thereof will also be arranged in a helical formation axially of the rotor shaft. As a result, an improved rotor comb construction is provided for a power lawn rake or related tool.

With this construction, several major advantages are realized: First, the spring tines may be manufactured conveniently and economically by a known wire-forming process. Second, the retention coil portions of the respective spring tines are mounted directly on the rotor shaft, and the necessity for special mounting brackets is eliminated. Third, the function of retention or keying to the rotor shaft is separated from the function of retraction or flexibility in actual usage. These required functions are performed independently by the retention coil portion and the working coil portion, respectively, of each spring tine. These respective portions of each tine may thus be designed for optimum performance. As a result, an overall economy is obtained in the manufacture and fabrication of the rotor, yet the construction facilitates machine assembly of the rotor (including automatic insertion of the spring tines) to realize a further savings, if desired.

The improved method of construction includes the positioning of the shaft in a suitable fixture on a machine, which (being conventional) have been omitted for ease of illustration. A first radial hole 33 is drilled in the tubular rotor shaft. The shaft is indexed circumferentially (by the angle $\theta$) and the shaft is advanced axially relative to drill, thereby positioning the shaft for drilling a second radial hole 33. The indexing and drilling operations are repeated, whereby the holes are arranged in a uniform helical formation along the axis of the shaft, as indicated by line 34 in FIG. 4. The retention coil portion 35 of each tine 16 is expanded slightly (relative to the O.D. of the shaft) and is slipped over the end of the shaft and released at its desired position on the shaft, such that the retention coil portion frictionally engages the outer surface of the shaft, and such that its inturned end portion 38 is received in a respective hole, thereby keying the tine to the shaft. The process is repeated for each tine. As a result, the tines are axially stacked along the given length of the rotor shaft, and the tines (and the respective ground-engaging elements thereof) are arranged in a uniform helical formation about the axis of the shaft.

Figures 6, 7:
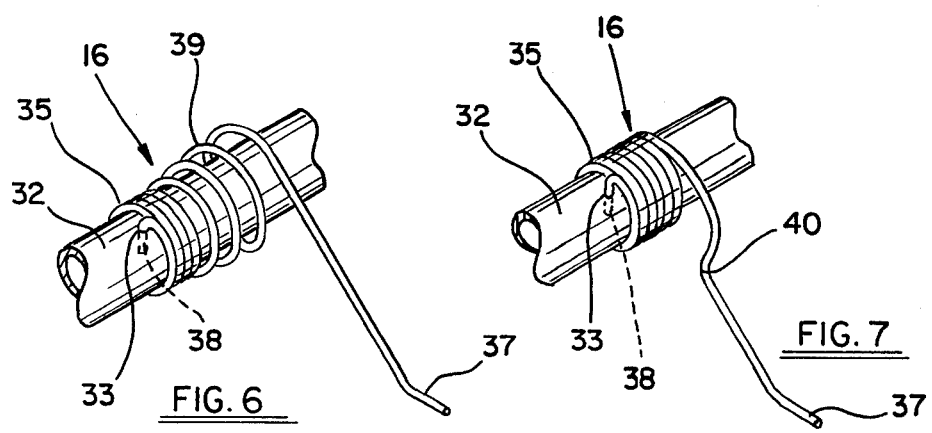
FIG. 6 is a perspective of an alternate embodiment of the present invention.
FIG. 7 is a further alternate embodiment.

A first alternate embodiment of the present invention is shown in FIG. 6. There, the working coil portion 39 is radially enlarged (substantially in the form of a helical coil spring) and is disposed axially of its respective retention coil portion and concentrically about the rotor shaft.

A second alternate embodiment is shown in FIG. 7. There, the working coil portion is eliminated and the ground-engaging element 37 is formed integrally with, and radially of, its respective retention coil portion 35. However, the element 37 has a further bent portion 40 to facilitate its retraction or flexing in the event a foreign object is encountered by the rotating tine.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A rotor comb construction for a power lawn rake, comprising in combination a tubular rotor shaft, the shaft having a plurality of axially spaced radial holes formed in a uniform helical formation therein, and a corresponding plurality of axially stacked tines mounted on the shaft, each tine including:
- retaining means having at least one coil means for constantly providing a complete 360° frictional engagement of said rotor shaft;
- said retaining means engaging soley said rotor shaft;
- keying means for keying said tine to said shaft in a predetermined angular relationship and for preventing permanent angular displacement of said tine from said predetermined angular relationship with said rotor shaft;
- said keying means consisting essentially of an inturned end portion of said one coil means being radially engaged in a respective rotor shaft hole;
- working means for providing transient angular displacement of said tine from said predetermined angular relationship with said rotor shaft to permit retraction and flexibility of said tine in usage;
- said working means including a discrete plurality of coil spring windings axially displaced along said rotor shaft from said at least one coil means of said retaining means and, together with said at least one coil means, forming a continuous coil encircling said shaft, said coil spring windings having a larger radius than said at least one coil means, such that said spring windings are normally out of engagement with said rotor shaft; and
- ground engaging means for combing the ground.

* * * * *